United States Patent [19]

Hargreaves et al.

[11] 4,243,791
[45] Jan. 6, 1981

[54] ANAEROBIC ADHESIVES

[75] Inventors: Keith Hargreaves, Huby, near Leeds; David Hartley; Paul Wainwright, both of Leeds, all of England

[73] Assignee: Rocol Limited, Leeds, England

[21] Appl. No.: 5,728

[22] Filed: Jan. 23, 1979

[51] Int. Cl.³ .................................. C08F 236/06
[52] U.S. Cl. .................. 526/320; 525/264; 526/323.2; 526/326
[58] Field of Search ........... 525/264; 526/320, 323.2, 526/326

[56] References Cited

U.S. PATENT DOCUMENTS

| | | | |
|---|---|---|---|
| 3,766,132 | 10/1973 | Lee et al. | 526/326 |
| 3,873,638 | 3/1975 | Olson | 525/264 |
| 4,069,378 | 1/1978 | DeMarco | 526/323.2 |

FOREIGN PATENT DOCUMENTS

| | | |
|---|---|---|
| 1254584 | 2/1969 | United Kingdom . |
| 1498825 | 1/1978 | United Kingdom . |
| 1505348 | 5/1978 | United Kingdom . |

Primary Examiner—William F. Hamrock
Attorney, Agent, or Firm—Larson, Taylor and Hinds

[57] ABSTRACT

An anaerobic adhesive comprising as a bond forming system a polymerizable aromatic-based acrylate monomer and a compatible liquid butadiene acrylonitrile copolymer, together with a latent initiator for the polymerization, said aromatic based acrylate monomer having the general formula

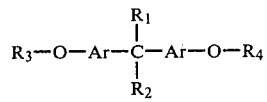

where:
Ar is a divalent aromatic residue;
$R_1$ and $R_2$ represent hydrogen, alkyl, aryl, or hydroxyalkyl groups, or halogen; and
$R_3$ and $R_4$ represent

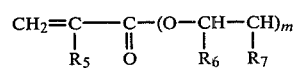

where m is an integer of from 1 to 20 and $R_5$, $R_6$, and $R_7$ represent hydrogen, alkyl, or alkoxy groups, or halogen, the same or different.

15 Claims, No Drawings

ANAEROBIC ADHESIVES

The invention relates to anaerobic adhesives.

Such adhesives, as is well known, are compositions of a monomer and a latent initiator or catalyst that remain unpolymerised while in contact with oxygen but polymerise to the solid state when oxygen is excluded. Additives such as accelerators for the polymerisation, and inhibitors of premature polymerisation while the composition remains exposed to air, are generally present also. The compositions find particular application in locking nuts, studs and other fasteners, curing readily between metal surfaces when oxygen is excluded, and also in sealing applications and for example the locking of bearings in their housings.

Anaerobic adhesives based on monomers containing aromatic rings are more heat stable than those based on aliphatic glycol monomers, e.g. polyalkylene glycol dimethacrylates.

For example in a test an adhesive based on an ethoxylated bisphenol A dimethacrylate monomer, using 3/16" steel nuts and bolts as test specimens, strength under heating fell steadily but was still at 50% of its original level after 40 hours at 204° C. An otherwise similar adhesive based on polyalkylene glycol dimethacrylate monomer was down to 50% of its original strength after less than 4 hours, and at 40 hours showed only some 5% of its original strength. Essentially its resistance to continued exposure to such temperatures was negligible.

It has now been surprisingly discovered that the thermal degradation characteristics of anaerobic adhesive based on ethoxylated bisphenol A dimethacrylate and other aromatic based acrylate monomers may themselves be given a substantial improvement by the addition of a butadiene-based polymer, particularly a butadiene acrylonitrile copolymer, preferably carboxyl, vinyl or amino terminated. The additive polymer will generally be a liquid, where liquid anaerobic adhesives are being formulated, but broadly it has only to be compatible with the formulation. No difficulty is to be expected in this regard with any conventional polymer, whether ordinary fluid adhesives or, for example, assembly pastes are being made up.

Examples of suitable polymers are 'Hycar' CTBN grades (Trade Mark of Goodrich Rubber) which are carboxyl terminated liquid copolymers of butadiene and acrylonitrile of for example the ideal formula:

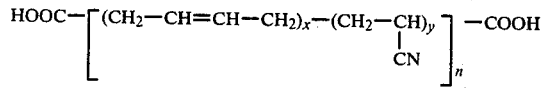

where, averaged, $x=5$, $y=1$, $n=10$ and where the end-group functionality is 1.5 to 2.5, representing a proportion of butadiene-terminated and branched polymers.

More generally, suitable polymers are:

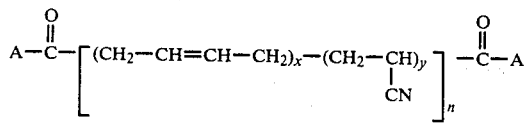

where A is a suitable terminating group, desirably polar (e.g. carboxyl, amine, hydroxyl) or unsaturated (e.g. vinyl). Suitably further for example:

$x=1-10$
$y=0-3$
n is up to 200

The case where $y=0$ of course represents a solely butadiene-based polymer.

Amine end groups are particularly suitable especially secondary amine groups. A specific possibility for A is

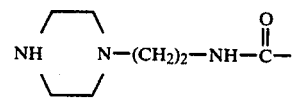

which combines amide, tertiary amine and secondary amine functions.

Relative amounts of the components can be broadly expressed, for example 0.5 or 1% up to 30% or even 60%, preferably 1-20%, additive polymer related to the total of polymer and acrylate monomer.

The aromatic based monomers may for example be esters of alkoxylated derivatives of bisphenol A:

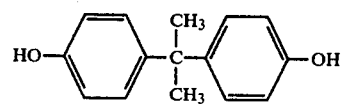

or bisphenol C (as above but with —CH$_2$— substituted for —C(CH$_3$)$_2$—) or similar compounds with substituents in the benzene rings, with substituents other than methyl groups on the central carbon atom, or with other aromatic groups, substituted or not, in place of the benzene rings.

Among suitable monomers are therefore those that may be generally represented as below and are the subject of our U.K. Pat. No. 1,412,940, namely:

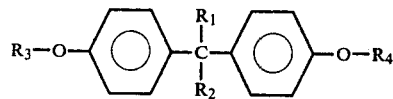

where:
the aromatic groups are benzene rings or other aromatic groups substituted or not;
R$_1$ and R$_2$ represent hydrogen, alkyl, aryl or hydroxyalkyl groups, or halogen; and
R$_3$ and R$_4$ represent

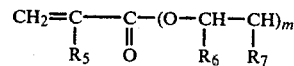

where m is an integer, for example 1 to 20 and preferably 1 to 5, and R$_5$, R$_6$ and R$_7$ represent hydrogen, alkyl or alkoxy groups, or halogen, the same or different.

Examples of aromatic groups other than benzene are naphthalene, anthracene and other polynuclear groups. The alkyl groups may be for example methyl, ethyl and other primary, secondary or tertiary alkyl groups and the hydroxyalkyl groups for example hydroxyethyl. The preferred halogen is chlorine.

A particularly preferred aromatic-based monomer is the dimethacrylate of propoxylated bisphenol A, the number of propoxyl residues in the chain being preferably as above; others, similarly, are propoxylated bisphenol C dimethacrylate, ethoxylated bisphenol A dimethacrylate, and ethoxylated bisphenol A di-acrylate.

Advantages of the above aromatic based monomers, many of which are given in the specification of the U.K. patent mentioned above, include potentiality for very short cure times (less than an hour to finger tight) in compositions nevertheless retaining good shelf life; ability to prepare compositions of higher viscosities of 500 cp upwards, allowing for wide tolerances in parts to be treated without need for additives detracting from the properties of the compositions as adhesives; ready variation in fully cured strength so that products are available for example for simple vibration proofing where subsequent dismantling is required or for permanent bonding in heavy assembly work; potentiality for making compositions suitable for a wide variety of metal surfaces including zinc and cadmium plated fasteners widely required in assembly work but rather inactive in promoting cure; good basic heat stability; and good retention of pre-load of treated fasteners under vibration, by reason of the polymer structure given by the aromatic residues. All these advantages are retained in the context of the present invention, with the improved heat resistance.

In addition to the copolymer and aromatic-based monomer used according to the invention, the compositions may also contain an amino-alcohol acrylate ester, particularly 2-(N,N-dimethylamino)-ethyl methacrylate (DMAEMA), copolymerisable with the aromatic based monomers. Compositions containing these esters are the subject of our U.K. Pat. No. 1,444,770.

An amino-alcohol acrylate ester is the reaction product of an amino alcohol and an acrylic acid such as methacrylic acid or acrylic acid itself, and preferred esters may be designated by the following:

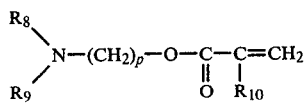

where
$R_8$ = H or alkyl
$R_9$ = alkyl
$R_{10}$ = H or alkyl, preferably methyl
p = 2 to 5
and the alkyl groups may be the same or different.

The DMAEMA or other such ester may replace e.g. 1 up to 40% of the aromatic based monomer. It gives increased bond strength compared to compositions without it, as measured by break-loose torque, on ordinary materials such as steel and also gives a good bond with brass, zinc, cadmium, nickel, chromium and stainless steel surfaces some of which are very inactive in promoting polymerisation of anaerobic adhesives. (Mild or high tensile steel for example has a catalytic action on the polymerisation reaction, while stainless steel is inactive with many monomers.) An advantageously wide range of surfaces is suitable for bonding and, further, short setting times can be achieved. Also, the formulation is stable over a long period both in itself and in respect of the strength of the final bond, which as already noted, is itself high.

It is believed that the desirable properties of the amino alcohol acrylates are due to co-reaction with the aromatic-based monomers during polymerisation, and that the strength shown is due at least in part to strong absorption of amino-alcohol acrylate residues at the metal surface. It is the strength of adhesion to the bonded surfaces that is normally the limiting factor in bond strength of an anaerobic adhesive rather than the shear strength of the adhesive itself, and the nitrogen atom is believed to play an important part in the adhesion. If one uses for example 15% of 2-hydroxyethylmethacrylate, a commercially available material regarded for many purposes as comparable to dimethylaminoethylmethacrylate, the desirable results obtainable with the latter are not shown. The final break-loose torque is reduced, and further the finger-tight setting time is comparable to that of unmodified compositions containing only the aromatic based monomers.

The latent initiator or catalyst for polymerisation, operational when oxygen is excluded from access to the composition, as between metal surfaces to be sealed, is preferably p-menthane hydroperoxide but a wide range of other hydroperoxides is suitable, including for example di-isopropyl benzene hydroperoxide and cumene hydroperoxide. The hydroperoxides may be used in admixture with peroxides, particularly dialkyl peroxides such as di-tertiary butyl peroxide.

Preferably the compositions contain also an amine, preferably a primary amine, as an accelerator for the polymerisation once it has begun. The use of 2-aminopyridine gives particularly good results. Other suitable amines are alkylamines such as triethylamine or tributylamine, 4-aminopyridine, 3-aminoquinoline, the N,N-dimethyl derivatives of aniline, 4-nitro-aniline, toluidine and 1-napthylamine, and N,N-diethyl aniline. A wide range of other nitrogen or sulphur containing compounds can however be used as accelerators, including 2,4-dinitrophenol, dodecane-1-thiol, N,N-dimethyl coco amine N-oxide, alpha picoline N-oxide and tris methyl aziridine oxide.

Preferably also a quinone or other stabiliser against premature polymerisation, in the absence of air, for example paraquinone (1,4-benzoquinone) or hydroquinone, is present. Other suitable quinones are e.g. acenaphthene quinone and 9,10-anthraquinone.

The relative amounts of the various components of the compositions are preferably as follows:
85 to 95 parts of acrylate monomer(s) and the additive polymer taken together
4 to 10 parts of the hydroperoxide initiator
0.5 to 5 parts of the amine, or other accelerator when present
5 to 1000 parts per million, based on the monomer, of the quinone, when present.

The present invention is exemplified by the following example, in which compositions are given in parts by weight.

EXAMPLE 1

The following anaerobic adhesive was prepared for comparison:

| Comparative Formulation | |
|---|---|
| Ethoxylated bisphenol A dimethacrylate | 77 |
| Castor oil first pressings (plasticiser) | 10 |
| Acrylic acid | 6 |
| Triethylamine (catalyst) | 2 |

| Comparative Formulation | |
|---|---|
| p-Menthane hydroperoxide (initiator system) | 4.5 |
| t-Butyl peroxide | 0.5 |
| Hydroquinone (stabiliser) | 0.02 |

The following adhesive was prepared as an example of the invention:

| Formulation of Example 1 | |
|---|---|
| 'Hycar' CTBN rubber 1300 × 8 | 10 |
| Ethoxylated bisphenol A dimethacrylate | 77 |
| Acrylic acid | 6 |
| Triethylamine | 2 |
| p-menthane hydroperoxide | 4.5 |
| t-Butyl peroxide | 0.5 |
| Hydroquinone | 0.02 |

Properties of the rubber, a carboxyl terminated acrylonitrile butadiene copolymer, were:

| | |
|---|---|
| Viscosity at 27° C. Brookfield RVT 7 at 20 rpm (Cps) | 125,000 |
| EPHR carboxyl (equivalents per 100 parts) | 0.053 |
| Percent carboxyl | 2.37 |
| Molecular weight, number average | 3500 |
| Functionality | 1.85 |
| Acrylonitrile content, % | 17.0 |
| S.G. (25/27° C.) | 0.948 |

Test Method

To compare their properties the above adhesives were applied to pins according to the following test method:

The anaerobic adhesive is placed on the pin which is inserted into a bush to ensure 100% coverage. 6 units are allowed to cure for 72 hours at 22° C.±2° C. The static shear strength is determined by pushing the pin through the bush using a manually operated hydraulic press, the load required being measured by means of a load cell with an analogue read-out. Care is taken to apply a steady load to the pin. Results are quoted as static shear strength, the average of six shear strength results (lbs) related to one square inch surface area.

The specification of the bushes and pins is as follows:

| Bushes | |
|---|---|
| Internal diameter | = 0.500″ + 0.0005 − 0.0000 |
| Length | = 0.500″ ± 0.005 |
| Surface finish | = 60 to 80 μ ins CLA |
| Material | = ENIA |

| Pins | |
|---|---|
| External diameter | = 0.5000″ + 0.00015 − 0.0020 |
| Surface finish | = 60 to 80 μins CLA |
| Material | = ENIA |

In applying the test 72 hours cure time at room temperature was allowed then the bush and pin assemblies were kept at 204° C. and the shear strength (psi) tested at the time intervals quoted:

| Results | After Cure | After 72 hrs @ 204° C. | After 168 hrs @ 204° C. |
|---|---|---|---|
| Comp. | 3200 | 1100 | 90 |
| Ex. 1 | 3300 | 3550 | 400 |

Conclusions

The results indicate a substantial improvement in strength, brought about by the addition of the butadiene-acrylonitrile copolymer. This is commercially important because it extends the upper temperature limit of operation of anaerobic adhesives, so opening up a wider field for their use commercially e.g. use in high-temperature stoving conveyors, brake pad assemblies, etc.

EXAMPLES 2–27

The following results, at 235° C., quoted as % of original strength after 72 hours room temperature cure and given by tests on 5/16″ nuts and bolts by the standard break loose torque method described in our earlier patents, illustrate use of various amounts and kinds of additive. The percentages of additive polymer are based on the total of polymer and acrylate monomer, and the basis formulation is given following Example 50.

TABLE 1

Bright Steel Surfaces (a) Carboxyl terminated acrylonitrile butadiene rubber
(17% acrylonitrile 83% butadiene) ('Hycar' CTBN 1300 × 8)

| Ex. | % Rubber | 72 Hrs | 168 Hrs | 240 Hrs |
|---|---|---|---|---|
| Comp. | 0 | 79 | 29 | 4 |
| Ex. 2 | 1 | 105 | 55 | 18 |
| Ex. 3 | 6 | 104 | 43 | 24 |
| Ex. 4 | 10 | 200 | 180 | 160 |
| Ex. 5 | 20 | 200 | — | 130 |
| Ex. 6 | 30 | 248 | 217 | — |

(b) Carboxyl terminated acrylonitrile butadiene rubber
(27% acrylonitrile 73% butadiene) ('Hycar' CTBN 1300 × 13)

| Ex. | % Rubber | 72 Hrs | 168 Hrs |
|---|---|---|---|
| Comp. | 0 | 105 | 30 |
| Ex. 7 | 5 | — | 65 |
| Ex. 8 | 10 | 130 | 120 |
| Ex. 9 | 20 | 140 | 128 |
| Ex. 10 | 30 | 177 | — |

(Properties of 'Hycar' 1300 × 13 are similar to those of 'Hycar' CTBN 1300 × 8 but with a viscosity of 625000 cP, % carboxyl 2.40 and S.G. 0.960)

(c) Vinyl terminated acrylonitrile butadiene rubber
(16.5% acrylonitrile 83.5% butadiene) ('Hycar VTBN 1300 × 22)

| Ex. | % Rubber | 72 Hrs | 168 Hrs |
|---|---|---|---|
| Comp. | 0 | 95 | 30 |
| Ex. 11 | 0.5 | 105 | 35 |
| Ex. 12 | 5 | — | 91.3 |
| Ex. 13 | 10 | 110 | — |
| Ex. 14 | 15 | 115 | 81 |
| Ex. 15 | 20 | 130 | 82 |
| Ex. 16 | 30 | 153 | 126 |

(d) Amine terminated acrylonitrile butadiene rubber
(16.5% acrylonitrile 83.5% butadiene) ('Hycar ATBN 1300 × 16)

| Ex. | % Rubber | 72 Hrs | 168 Hrs |
|---|---|---|---|
| Comp. | 0 | 105 | 30 |
| Ex. 17 | 0.5 | — | 71 |
| Ex. 18 | 5 | 116 | 75 |
| Ex. 19 | 10 | 110 | 70 |
| Ex. 20 | 20 | 141 | 92 |
| Ex. 21 | 30 | 145 | 84 |

TABLE 2

Cadmium surfaces (rubbers as Table 1)

(a) Carboxyl terminated (17% acrylonitrile)

| Ex. | % Rubber | 72 Hrs | 240 Hrs |
|---|---|---|---|
| Comp. | 0 | 220 | 133 |
| Ex. 22 | 6 | 268 | 144 |

(b) Carboxyl terminated (27% acrylonitrile)

| Ex. | % Rubber | 72 Hrs | 168 Hrs |
|---|---|---|---|
| Comp. | 0 | 120 | 99.5 |
| Ex. 23 | 5 | 123 | 128 |

(c) Vinyl terminated

| Ex. | % Rubber | 72 Hrs | 168 Hrs |
|---|---|---|---|
| Comp. | 0 | 120 | 99.5 |
| Ex. 24 | 5 | 191 | 211 |

(d) Amine terminated

| Ex. | % Rubber | 72 Hrs | 168 Hrs |
|---|---|---|---|
| Comp. | 0 | 120 | 99.5 |
| Ex. 25 | 5 | 199 | 191 |

TABLE 3

Chromium surfaces (rubbers as Table 1)

(a) Carboxyl terminated (27% acrylonitrile)

| Ex. | % Rubber | 72 Hrs | 168 Hrs |
|---|---|---|---|
| Comp. | 0 | 116 | 71 |
| Ex. 26 | 5 | 215 | 171 |

(b) Vinyl terminated

| Ex. | % Rubber | 72 Hrs | 168 Hrs |
|---|---|---|---|
| Comp. | 0 | 116 | 71 |
| Ex. 27 | 5 | 159 | 96 |

EXAMPLES 28 TO 41

The following examples all contain 'Hycar' CTBN 1300×8 rubber (17% acrylonitrile) copolymer, but illustrate variation in the other components of the compositions.

TABLE 4

| Components % by weight | Ex. 28 | 29 | 30 | 31 | 32 | 33 | 34 | 35 | 36 | 37 | 38 | 39 | 40 | 41 |
|---|---|---|---|---|---|---|---|---|---|---|---|---|---|---|
| Diacryl 101 | 45.3 | 71.53 | 84.47 | 84.29 | 63.41 | 81.82 | 80.5 | 80.06 | 80.22 | 78.38 | 78.11 | 71.7 | 76.0 | 66.00 |
| 'HYCAR' CTBN | 9.04 | 20.0 | 0.97 | 0.88 | 1.22 | 1.88 | 3.70 | 3.99 | 4.47 | 6.30 | 5.61 | 10.0 | 15.0 | 11.00 |
| Lauryl methacrylate | 18.20 | — | 1.94 | 3.04 | 23.07 | 5.95 | 1.85 | 5.83 | 5.16 | 5.40 | 6.40 | — | — | 9.0 |
| DNAEMA | 18.40 | — | 3.88 | 2.94 | 2.93 | 2.82 | 6.48 | 2.76 | 2.77 | 2.70 | 2.69 | 5.0 | — | — |
| Acrylic Acid | — | 4.24 | — | — | — | — | — | — | — | — | — | 2.3 | 4.5 | 6.0 |
| p-Methane hydroperoxide | 4.53 | 2.82 | 5.34 | 4.41 | 6.15 | 4.23 | 4.17 | 4.14 | 4.15 | 4.05 | 4.04 | 7.2 | 3.0 | 4.5 |
| Ditertiary butyl peroxide | 0.45 | — | 0.46 | 0.47 | 0.66 | 0.45 | 0.44 | 0.43 | 0.43 | 0.44 | 0.43 | 0.8 | — | 0.5 |
| p-Benzoquinone | 0.014 | — | 0.03 | 0.03 | 0.02 | 0.03 | 0.03 | 0.03 | 0.03 | 0.03 | 0.03 | — | — | — |
| Hydroquinone | — | — | — | — | — | — | — | — | — | — | — | 0.06 | — | 0.02 |
| 2-Amino pyridine | 4.53 | — | 2.91 | 2.94 | 2.54 | 2.82 | 2.78 | 2.76 | 2.77 | 2.70 | 2.69 | 3.0 | — | — |
| Triethylamine | — | 1.41 | — | — | — | — | — | — | — | — | — | — | 1.5 | 3.0 |

The following test results for these compositions were obtained, according to the purpose for which the compositions are suitable. All further showed good heat resistance.

| Ex. 28 | Low viscosity wicking composition for assembled screws) Break loose torque on bright steel | |
|---|---|---|
| Ex. 29, 40 | nuts and bolts 5/16" (fluid/paste compositions for instant gaskets) | 50–100 in/lbs |
| | Bush and pin shear strength, | |
| | - steel | 1500 psi |
| | - aluminium | 800 psi |
| Ex. 30, 31, 33, 34, 35, 36, 37, 38 | (fluid compositions for locking nuts) Break loose torque on bright steel nuts and bolts 5/16" | 100–150 in/lbs |
| Ex. 32 | (fluid composition for locking screws) Break loose torque on bright steel nuts and bolts 5/16" | 50–100 in/lbs |
| Ex. 39 | (fluid composition for locking collars on shafts) Bush and pin shear strength, - steel | 3500 psi |
| Ex. 41 | (fluid composition for locking bearings in housings) Bush and pin shear strength, - steel | 2000 psi |

Abbreviations in Table 4

Diacryl 101 Ethoxylated bisphenol A dimethacrylate
DMAEMA—Dimethylaminoethyl methacrylate

EXAMPLES 42–50

The results of further tests again are given below, using 10% of various copolymers (Examples 42 to 45) or 10% of various copolymers with a basic 2% of 'Hycar' CTBN 1300×8 carboxyl terminated acrylonitrile butadiene rubber (Examples 46 to 50). The formulation used as the basis is given after the results. Additive polymer content is based on the total polymer + aromatic-based monomer. Test method as in Examples 2–27, on bright steel surfaces.

TABLE 5

BLT Test Results (in/lbs)

| Ex. | Copolymer | 72 Hrs R/T | 72 HRS | 360 Hrs 235° C. | 720 Hrs |
|---|---|---|---|---|---|
| Comp. | — | 189 | 197 | 30 | 0 |
| Ex. 42 | 10% 'Hycar' CTBN 1300 × 8 (17% acrylonitrile) | 102 | 206 | 162 | 136 |
| Ex. 43 | 10% 'Hycar' GTBN 1300 × 13 | 156 | 202 | 176 | 147 |

TABLE 5-continued

| | | BLT Test Results (in/lbs) | | | |
|---|---|---|---|---|---|
| Ex. | Copolymer | 72 Hrs R/T | 72 HRS | 360 Hrs 235° C. | 720 Hrs |
| | (27% acrylonitrile | | | | |
| Ex. 44 | 10% 'Hycar' VTBN 1300 × 22 | 175 | 194 | 181 | 130 |
| Ex. 45 | 10% 'Hycar' ATBN 1300 × 16 | 150 | 166 | — | 146 |

TABLE 6

| | | BLT Test Results (in/lbs) | | | |
|---|---|---|---|---|---|
| Ex. | Copolymer | 72 Hrs R/T | 72 Hrs | 360 Hrs 225° C. | 720 Hrs |
| Ex. 46 | 2% 'Hycar' CTBN 1300 × 8 | 149 | 213 | 194 | 128 |
| Ex. 47 | 12% 'Hycar' CTBN 1300 × 8 | 39 | 149 | 156 | 168 |
| Ex. 48 | 2% 'Hycar' CTBN 1300 × 8 + 10% 'Hycar' 1300 × 13 | 97 | 176 | 200 | 197 |
| Ex. 49 | 2% 'Hycar' CTBN + 10% 'Hycar' VTBN*' 1300 × 22 | 157 | 187 | 202 | 210 |
| Ex. 50 | 2% 'Hycar' CTBN + 10% 'Hycar' ATBN*2 1300 × 16 | 113 | 154 | 184 | 193 |

Strengths in Tables 5 and 6 are break-loose torque averages of 6 standard 5/16" nuts and bolts in lbs/in.
*'Vinyl terminated
*2Amine terminated

Conclusion

It was found that all the additive copolymers greatly improved the heat resistance of the basis formulation, which is a commercially available adhesive for studs (Rocol Limited). In addition the 3 additives tested did not affect the 72 hour R.T. (room temperature) shear strength of the adhesive (as does 'Hycar' CTBN).

The above results show the good high temperature performance of 'Hycar' CTBN, VTBN and ATBN. Hycar VTBN is particularly interesting in that in addition to good hot strength it does not impair the room temperature performance and is therefore particularly suitable as a viscosity modifier in threadlocking and retaining compounds.

Properties of
(i) 'Hycar' VTBN 1300×22

| | |
|---|---|
| Brookfield viscosity at 27° C., cP | 200,000 |
| % acrylic vinyl | 3.0 |
| Acrylonitrile content | 16.5 |
| S.G. at 25° C. | 0.962 |

(ii) 'Hycar' ATBN 1300×16

| | |
|---|---|
| Brookfield viscosity at 27° C., cP | 225,000 |
| Total equivalent weight | 800–1000 |
| Acrylonitrile % | 16.5 |
| S.G. at 25° C. | 0.956 |

Comparative basis formulation, Examples 2–27 and 42–50:

| | |
|---|---|
| Diacryl 101 | 86.6 |
| 2-Amino pyridine | 1.9 |
| DMAEMA | 7.5 |
| p-Methane hydroperoxide | 3.6 |
| di-Tertiary butyl peroxide | 0.4 |
| p-Benzoquinone | 0.02 |

We claim:

1. An anaerobic adhesive comprising as a bond forming system a polymerizable aromatic-based acrylate monomer and a compatible liquid butadiene acrylonitrile copolymer, together with a latent initiator for the polymerization, said aromatic-based acrylate monomer having the general formula $$R_3-O-Ar-\underset{R_2}{\overset{R_1}{\underset{|}{\overset{|}{C}}}}-Ar-O-R_4$$

where:
Ar is a divalent aromatic residue;
$R_1$ and $R_2$ represent hydrogen, alkyl, aryl, or hydroxyalkyl groups, or halogen; and
$R_3$ and $R_4$ represent $$CH_2=\underset{R_5}{\overset{|}{\underset{|}{C}}}-\underset{O}{\overset{||}{C}}-(O-\underset{R_6}{\overset{|}{\underset{|}{CH}}}-\underset{R_7}{\overset{|}{\underset{|}{CH}}})_m$$

where m is an integer of from 1 to 20 and $R_5$, $R_6$, and $R_7$ represent hydrogen, alkyl, or alkoxy groups, the same or different.

2. An anaerobic adhesive according to claim 1 wherein said butadiene acrylonitrile copolymer is terminated by a group selected from the group consisting of carboxyl, amino, hydroxy, and vinyl groups.

3. An adhesive according to claim 1, wherein the aromatic based acrylate monomer is the dimethacrylate or diacrylate of ethoxylated or propoxylated bisphenol A or bisphenol C.

4. An adhesive according to claim 1, wherein the butadiene acrylonitrile copolymer comprises material of the general formula $$X-\left[(CH_2-CH=CH-CH_2)_x-(CH_2-\underset{CN}{\overset{|}{\underset{|}{CH}}})_y\right]_n-X$$

where X is a polar or unsaturated terminating group and
x = 1–10
Y = 0–3
n is up to 200.

5. An adhesive according to claim 1, containing an amino-alcohol acrylate ester monomer in part substitution for the aromatic-based acrylate monomer.

6. An adhesive according to claim 5, wherein the said ester is of the formula $$\underset{R_9}{\overset{R_8}{\diagdown}}N-(CH_2)_p-O-\underset{O}{\overset{||}{C}}-\underset{R_{10}}{\overset{|}{\underset{|}{C}}}=CH_2$$

where $R_8$ = H or alkyl
$R_9$ = alkyl
$R_{10}$ = H or alkyl, preferably methyl
p = 2 to 5
and the alkyl groups may be the same or different.

7. An adhesive according to claim 5, wherein the said ester monomer is 2-dimethylaminoethyl methacrylate.

8. An adhesive according to claim 1, wherein the amount of butadiene-based polymer is 0.5 to 60% by weight of the total of said polymer and acrylate monomer(s) present.

9. An adhesive according to claim 1, wherein the amount of butadiene-based polymer is 0.5 to 30% by weight of the total of said polymer and acrylate monomer(s) present.

10. An adhesive according to claim 1, wherein the amount of butadiene acrylonitrile copolymer is 1 to 20% by weight of the total of said polymer and acrylate monomer(s) present.

11. An adhesive according to claim 6 or 7, wherein the amount of amino-alcohol ester monomer is from 1 to 40% by weight of the total of aromatic-based and amino-alcohol ester monomer.

12. An adhesive according to claim 1, containing in combination butadiene acrylonitrile copolymer as in claim 6 and/or amino-alcohol ester monomer as in claim 7, 8 or 9.

13. An adhesive according to claim 12, containing the amount of butadiene-based polymer of claim 10 and/or the amount of amino alcohol ester monomer of claim 11.

14. An adhesive according to any of claims 3–13 comprising further a quinone or other compound effective to stabilise the composition while exposed to air.

15. An adhesive according to any one of claims 3–13 comprising further an amine or other accelerator for the polymerisation.

* * * * *